United States Patent [19]
LeFebvre

[11] Patent Number: 5,630,912
[45] Date of Patent: May 20, 1997

[54] OIL RECLAMATION DEVICE WITH EVAPORATOR BASE AND HEAD MOUNTED FILTER

[75] Inventor: Byron LeFebvre, Fort Lauderdale, Fla.

[73] Assignee: T F Purifiner, Inc., Boynton Beach, Fla.

[21] Appl. No.: 594,442

[22] Filed: Jan. 31, 1996

Related U.S. Application Data

[63] Continuation-in-part of Ser. No. 381,443, Jan. 31, 1995, abandoned.

[51] Int. Cl.$^6$ .......................... B01D 1/00; B01D 27/08; C10G 31/09
[52] U.S. Cl. .......................... 196/115; 196/121; 196/126; 196/127; 196/128; 208/179
[58] Field of Search .................... 196/115, 46.1, 196/121, 126, 127, 128; 208/179; 210/180, 184, 358, 436, 438, 439

[56] References Cited

U.S. PATENT DOCUMENTS

| | | | |
|---|---|---|---|
| 2,161,964 | 6/1939 | Brecque | 196/46.1 |
| 2,635,759 | 4/1953 | Schwalge | 210/439 |
| 4,189,351 | 2/1980 | Engel | 196/115 |
| 4,227,969 | 10/1980 | Engel | 196/115 |
| 4,289,583 | 9/1981 | Engel | 196/115 |
| 4,354,946 | 10/1982 | Warlick et al. | 196/46.1 |
| 4,943,352 | 7/1990 | Lefebvre et al. | 196/46.1 |
| 5,198,104 | 3/1993 | Menyhert | 196/115 X |
| 5,242,034 | 9/1993 | Depaul | 196/46.1 |
| 5,322,596 | 6/1994 | Arntz | 196/115 X |

*Primary Examiner*—Nina Bhat
*Attorney, Agent, or Firm*—Quarles & Brady

[57] ABSTRACT

An oil reclamation device includes an evaporator head and base both of heat conductive material and defining an evaporator chamber between them. An upwardly vertically extending heating element is disposed within the evaporator base for heating oil containing contaminants within the evaporator chamber by conduction and convection to evaporate light contaminants/liquids (e.g. water, fuel or antifreeze) in the oil. A vent extends from the evaporator chamber through the head, and an oil discharge conduit provides gravity discharge from the evaporator chamber and is formed in the base. An oil inlet conduit feeds oil from the head toward the evaporator chamber, preferably through a plurality of substantially evenly spaced passages formed in the head and flaring outwardly from the oil inlet conduit to the evaporator chamber to provide flow of oil in small, distinct, spaced streams to impact a portion of a generally annular frustoconical wall element extending upwardly form the base toward the head. An oil filter having a density differential between an outer canister and an inner central mandrel is mounted on the head for removing particles from the oil before it is refined.

10 Claims, 7 Drawing Sheets

OIL RECLAMATION DEVICE WITH EVAPORATOR BASE AND HEAD MOUNTED FILTER

CROSS-REFERENCE TO RELATED APPLICATION

This is a continuation-in-part of U.S. patent application Ser. No. 08/381,443, filed Jan. 31, 1995, now abandoned.

FIELD OF THE INVENTION

The invention relates to oil reclamation devices and more particularly to oil reclamation devices utilizing heating chambers to evaporate liquid contaminants.

BACKGROUND AND SUMMARY OF THE INVENTION

Oil reclamation devices for use in engines, motors, hydraulics, transmissions, and the like are gaining increasing popularity because they dramatically increase the time between oil changes for motors or engines and hydraulic equipment. Typical successful reclamation devices are shown in U.S. Pat. Nos. 4,943,352, 4,289,583, 4,227,969, and 4,189,351, the disclosures of which are incorporated by reference herein.

The invention relates to an oil reclamation device that has enhanced efficiency and ease of use compared to conventional oil reclamation devices. The device according to the present invention mounts an oil filter in such a way that access to the oil filter or replacement thereof is simple and effective. Also, the reclamation device according to the invention provides much more effective and efficient heat transfer by both conduction and convection, providing more effective evaporation of light liquids in the oil, such as water, antifreeze, fuel, and some more contaminants such as blow-by gases. The evaporated contaminants are readily removed without recondensing, and the oil is recirculated. More efficient evaporation is provided by utilizing a generally vertical electric resistance heating element which extends upwardly into an evaporator base. The base is of heat conductive material such as aluminum 319 or aluminum 356, which is also in heat conductive relationship with an evaporator head also of heat conductive material, such as aluminum 319 or aluminum 356. A chamber between the base and the head has wall elements which extend upwardly from the base and to which the oil is directed by a plurality of small conduits for distributing the oil, a thin film of oil passing over a wall element to be effectively heated.

The filter utilized according to the invention preferably comprises a twisted continuous filament of unbleached natural cotton which is wound around a center perforated mandrel so that there is a density variation across the filter, allowing more effective filtration by trapping larger particles in the outer perimeter and smaller particles closer to the center mandrel through which the oil flows to the reclamation device. This increases the useful life of the filter while also providing more effective filtration.

According to one aspect of the present invention an oil reclamation device is provided comprising the following elements: An evaporator head of heat conductive material. An evaporator base of heat conductive material mounted to and below the evaporator head, the head and base defining an evaporator chamber therebetween. A sealed stainless steel heating element which is preferably isolated from the oil and vapors and disposed within the evaporator base for heating oil containing contaminants within the evaporator chamber by conduction and convection to evaporate light contaminants in the oil. A vent from the evaporator chamber. An oil discharge conduit from the evaporator chamber formed in the evaporator base. And an oil inlet conduit feeding oil from the head toward the evaporator chamber.

The device also preferably comprises an oil filter for filtering oil prior to the oil passing into the oil inlet conduit. The oil filter is preferably mounted on the evaporator head on the opposite side thereof from the evaporator base. The oil filter preferably comprises an outer canister having filtering media (such as twisted continuous filament unbleached cotton) and a central mandrel. The filtering medium has a density differential of at least about 10% between the outer canister and the central mandrel, the density being higher adjacent the mandrel than adjacent the canister. The oil inlet conduit is adjacent the central mandrel and the oil filter is supported on the evaporator head.

The evaporator base comprises a base element and at least one generally annular wall element extending upwardly from the base element toward the evaporator head. A plurality of spaced channels are formed in the at least one wall element providing radially outward flow of oil from the oil inlet to the oil outlet. The oil is introduced into contact with the wall element or elements by a plurality (e.g. ten) of substantially evenly spaced passages formed in the evaporator head and flaring outwardly from the oil inlet conduit to the evaporator chamber. The oil flows in small, spaced, distinct streams to impact a portion of the wall element.

The heating element may be substantially concentric with the wall elements and comprise an electric resistance heating element which extends vertically upwardly. The wall elements may include at least one generally frustoconical wall element. The evaporator base and the evaporator head each preferably include first and second bosses, the first boss comprising an oil inlet for feeding oil from the head to the oil filter, and the second boss comprising an oil discharge conduit. A portion of the heating element extending upwardly from the evaporator base is covered by a protective cap, also preferably of aluminum. Electrical wire, shielded in a stainless steel flexible conduit, extends from the heating element through the protective cap.

The vent from the evaporator chamber preferably comprises a passageway which passes through the evaporator head radially remote from the heating element. The evaporator base and head are preferably in good heat conductive engagement with each other at a central portion of each.

The at least one generally annular wall element preferably comprises at least first and second concentric wall elements, the first wall element including a plurality of first channels formed therein, and the second wall element including a plurality of second channels formed therein, the first channels radially offset from the second channels so that refined oil must always follow a tortuous path after passing a thin film over the wall element, before exiting the outlet form the chamber. At least one of the second channels is preferably aligned with the oil discharge outlet.

According to another aspect of the present invention an oil reclamation device is provided comprising the following elements: An evaporator head of heat conductive material. An evaporator base of heat conductive material mounted to and below the evaporator head, the head and base defining an evaporator chamber therebetween. An upwardly vertically extending heating element disposed within the evaporator base for heating oil containing contaminants within the evaporator chamber by conduction and convection to evaporate light contaminants in the oil. A vent from the evaporator chamber. At least one generally annular wall element extending upwardly from the evaporator base toward the evaporator head. An oil discharge conduit from the evaporator chamber. And an oil inlet conduit feeding oil into the evaporator chamber.

It is the primary object of the present invention to provide an enhanced efficiency and utility oil reclamation device. This and other objects of the invention will become clear from an inspection of the detailed description of the invention and from the appended claims.

BRIEF DESCRIPTION OF THE DRAWINGS

FIG. 5 is a top view of the evaporator base of the oil reclamation device of FIG. 2, while

FIG. 7 is a bottom view of the evaporator head of the oil reclamation device of FIGS. 1 and 2, while

FIG. 11 is a top plan view of the evaporator head of the oil reclamation device of FIG. 9, while FIG. 13 is a top plan view of a lid for the canister housing of the oil reclamation device of FIG. 9, while

DETAILED DESCRIPTION OF EMBODIMENTS OF THE INVENTION

The invention is directed to an oil reclamation device utilizing a two stage filtration process in which oil introduced to the device is first filter through a filter medium and is then resented to a heating chamber for evaporation of additional liquid contaminants. The invention contemplates improvements in the device that lead to increased efficiency and maintenance as well as extended filter medium use.

Figure 1:
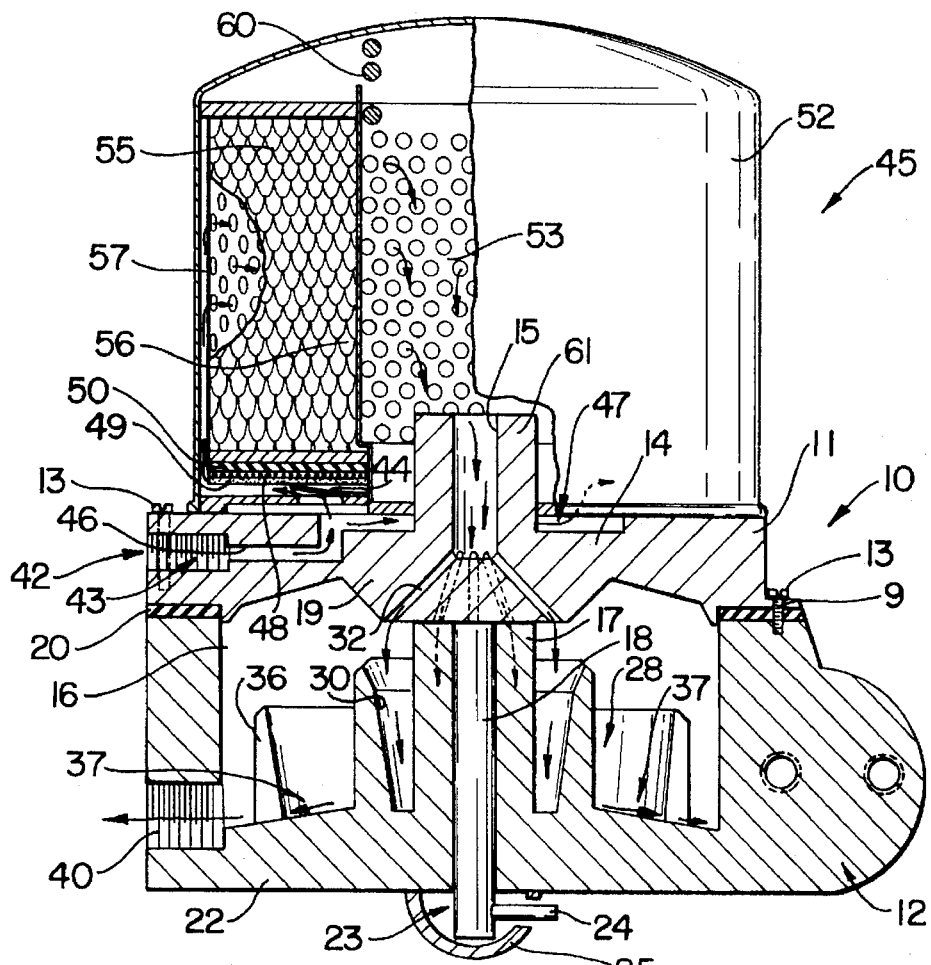
FIG. 1 is a side view, mostly in cross section but partly in elevation, of an exemplary oil reclamation device according to the present invention including an oil filter mounted thereon.
Figure 2:
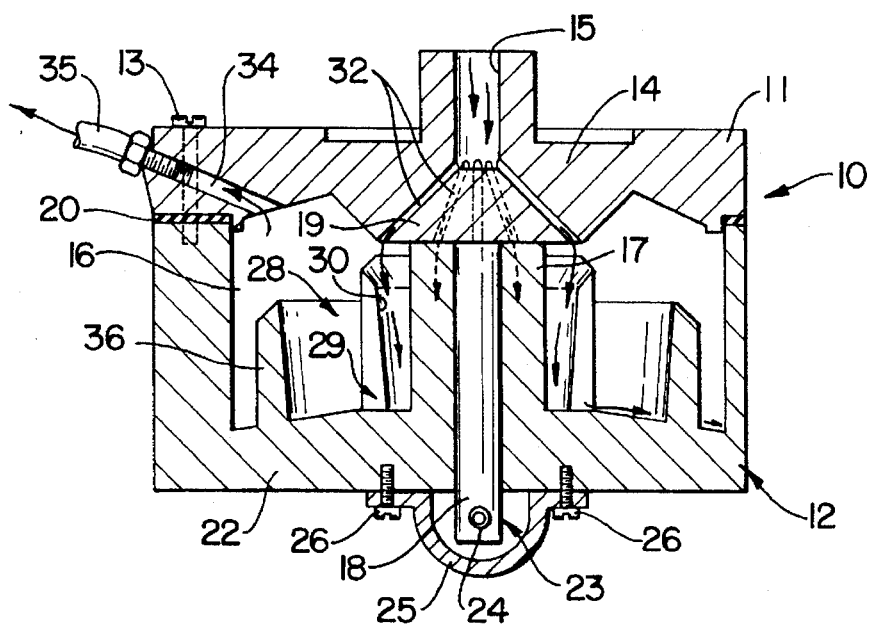
FIG. 2 is a view like that of FIG. 1, only turned ninety degrees, of just the oil reclamation device.
Figure 3:
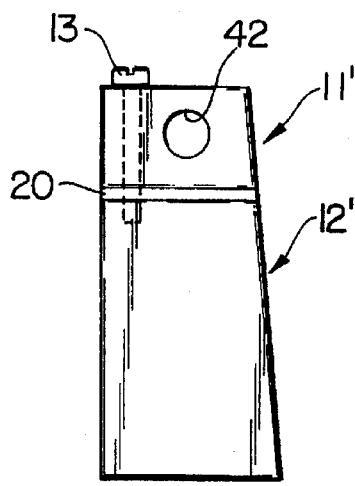
FIGS. 3 and 4 are end detail views, the other components being removed for clarity of illustration, of just the two bosses of the oil reclamation device of FIGS. 1 and 2.
Figure 4:
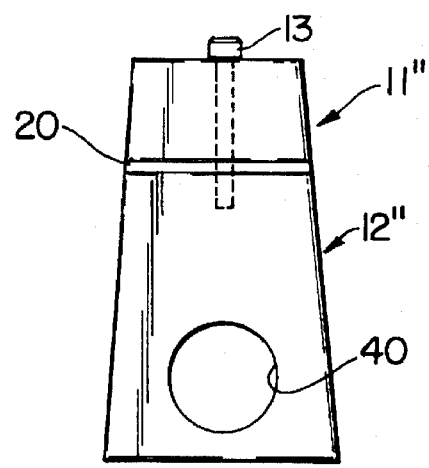
Figure 5:
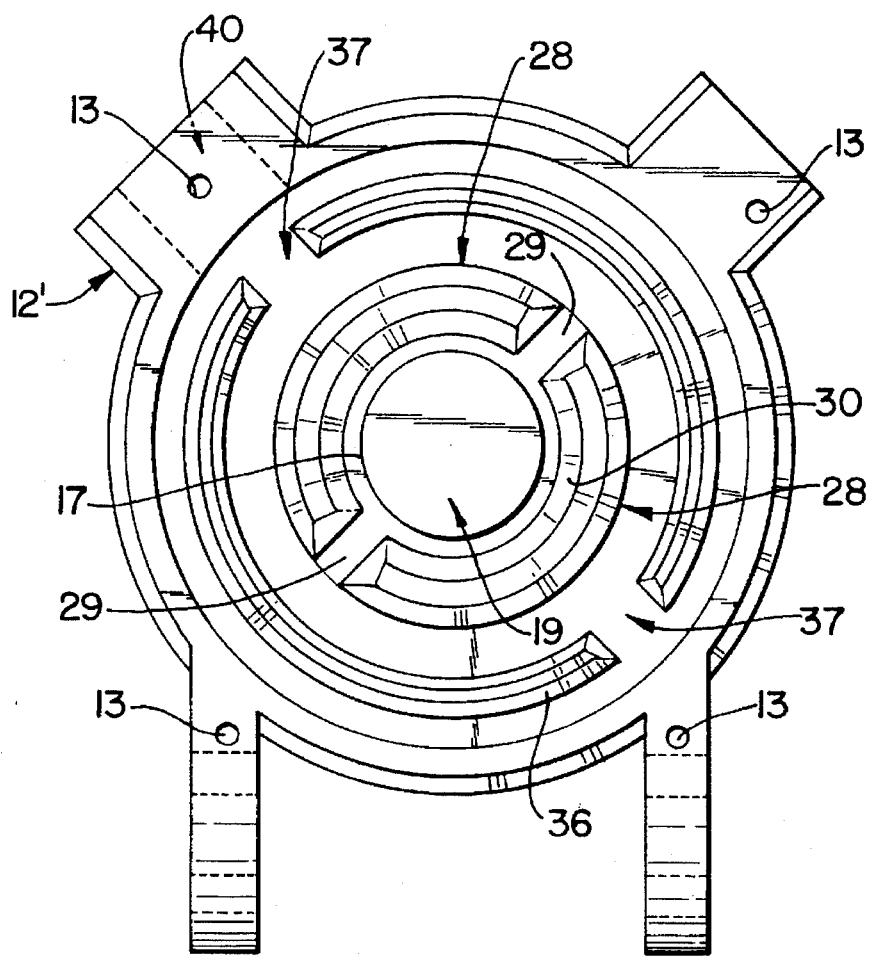
Figure 6:
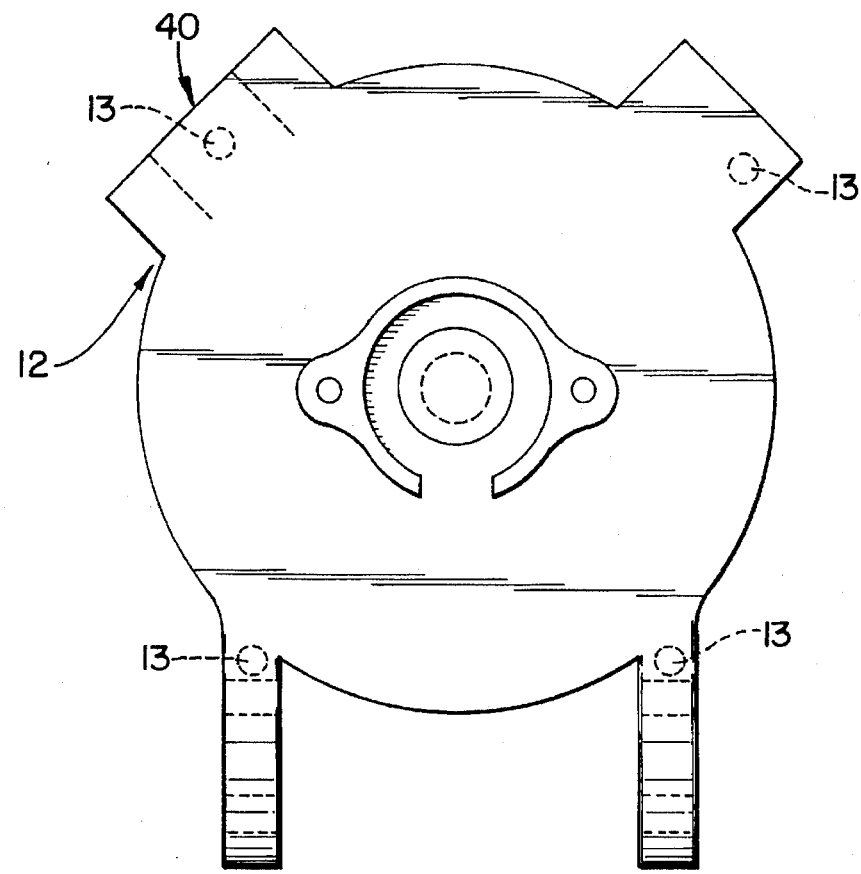
FIG. 6 is a bottom view of the evaporator base.

An exemplary oil reclamation device according to the present invention is shown generally by reference numeral 10 in FIGS. 1 and 2. The device 10 includes an evaporator head 11 of heat conductive material, such as aluminum 319 or aluminum 356, and an evaporator base 12, also of heat conductive material such as aluminum 319 or aluminum 356. While the base 12 is shown as a distinct element in the drawings, it is to be understood that it may be integrally formed with (e.g., case as part of) the head or block of an engine with which it is used.

The head 11 is preferably secured to the base 12 by a plurality (e.g., four) of stainless steel machine screws 13. The relative positions of the screws 13 are seen most clearly in FIGS. 3 through 6. The head 11 includes a central portion 14 which has an oil inlet conduit 15 extending generally vertically (as seen in FIGS. 1 and 2) downwardly therein for carrying oil to be treated to an evaporation chamber 6 formed between the head 11 and the base 12. The base 12 also includes a hollow generally tubular concentric post 17 in which a sealed stainless steel electric resistance heating element (which preferably extends generally vertically and upwardly) is provided, there being good heat conductive contact between the central portion 14 of the head 11 and the central tubular element 17 of the base 12 as indicated at area 19 in FIGS. 1 and 2. Around the periphery of the elements 11, 12 where they are clamped together by the machine screws 13, and a seal 20 (see FIGS. 1 through 4) is provided between them. The seal 20 is of conventional flexible and/or resilient sealing material such as synthetic rubber.

The base 12 includes a base element 22 and the heating element 18 has a portion 23 thereof which extends upwardly from the bottom of the base element 22. The heating element 18 is preferably a resistance type electric heating element that substantially maintains a constant wattage over time provide a uniform temperature, which can be preferably maintained, for example, at 180–200 degrees, in the evaporation chamber. An electric wire or wires 24 is/are provided for supplying electric current to the conventional electric resistance element 18, and the upwardly extending portion 23 may be protected by a protective cap 25, e.g. also of a metal such as aluminum. The wires 24 are shielded in a stainless steel flexible conduit. The protective cap 25 may be held to the base element 22 with a plurality of screws 26.

Extending upwardly from the base element 22 is at least one generally annular wall element, shown schematically by reference number 28. The entire construction preferred for the wall element 28 is seen most clearly by inspecting all of FIGS. 1, 2, and 5. The wall element 28 is generally annular, although having at least one and preferably two (or more) channels 29 formed therein for the radially outward flow of oil from the central tube 17. As seen in all of FIGS. 1, 2, and 5, the generally annular wall element 28 preferably has generally a frustoconical shape, and as seen in FIGS. 1 and 2, oil flows in a thin film down at least the heated interior surface 30 of the wall element 28 to the base 22.

Figure 7:
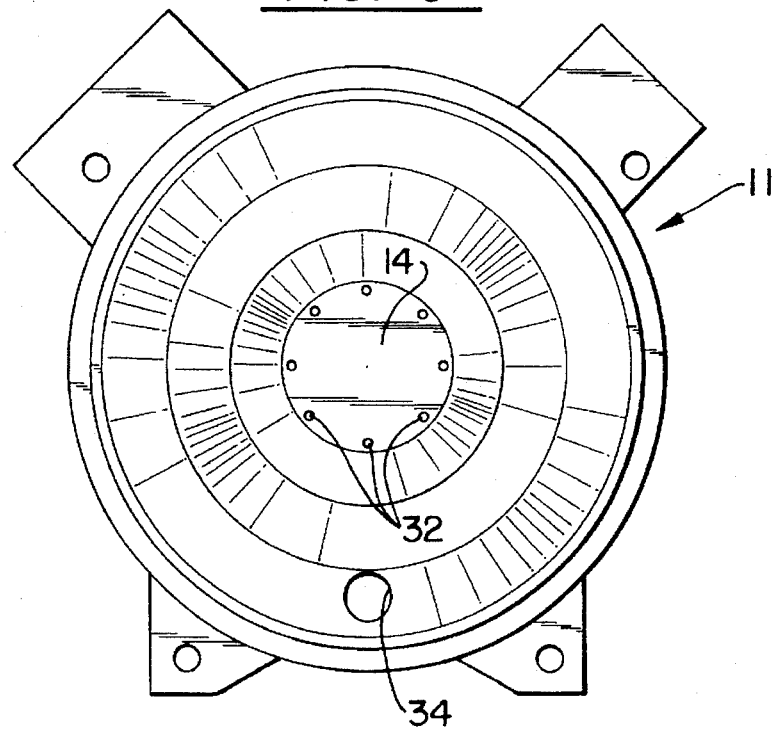
Figure 8:
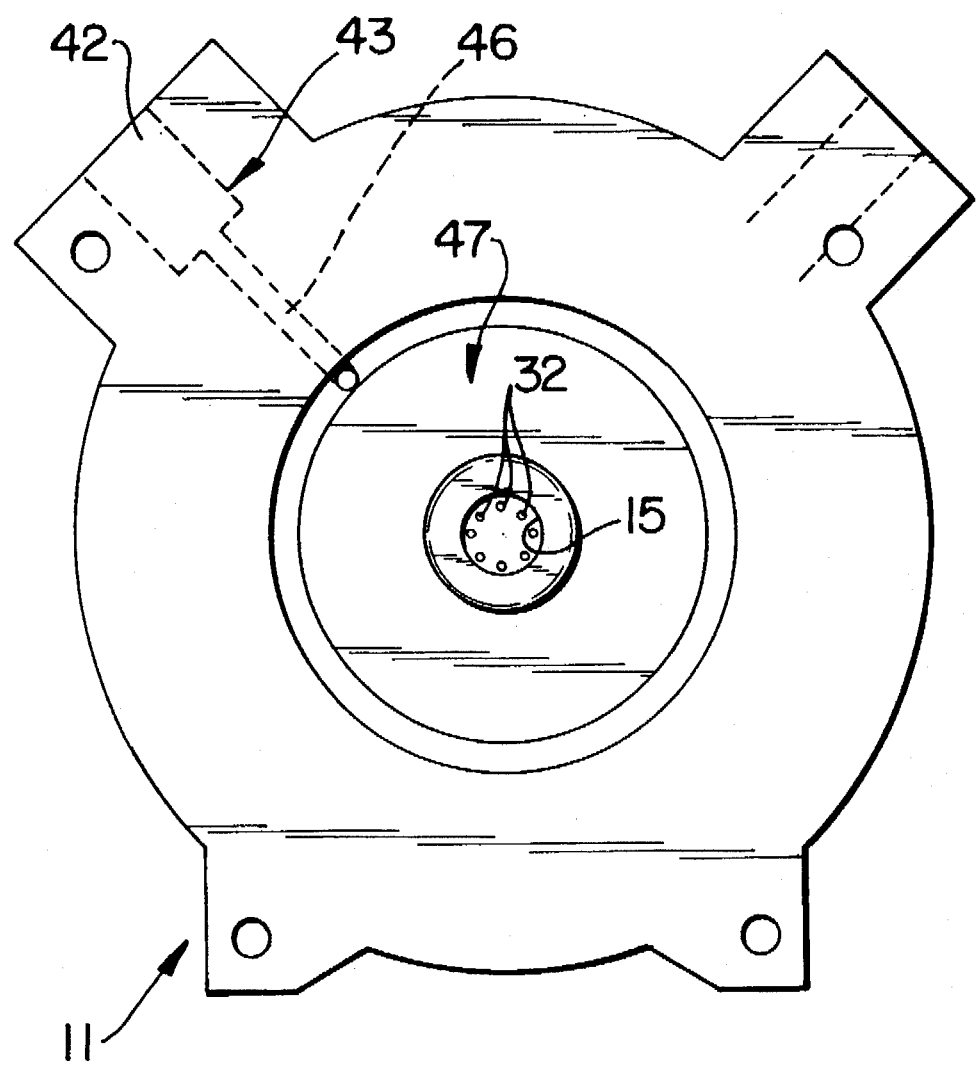
FIG. 8 is a top view of the evaporator head.

Oil is fed to the wall element 28 from a plurality of substantially evenly spaced passages 32 formed in the evaporator head 11 central portion 14, the general manner in which the passages 32 flow outwardly from the oil inlet conduit 15 being seen in FIGS. 1 and 2, and the spacing between the passages 32 being most clear from the bottom view of the evaporator head 11 provided in FIG. 7. Preferably about ten passages 32 are provided, each about 1/16 inch in diameter. The passages 32 provide for flow of oil into chamber 16 (in contact with wall 28) in small, spaced, distinct streams. The passages 32 may include, or comprise, jets, nozzles, or other flow directing, manipulating, or enhancing devices.

The head 11 also preferably comprises a vent 34 (see FIGS. 2 and 7) through which fumes (e.g. evaporated light liquids from the oil, such water, fuel, blow-by gases, and antifreeze) pass out of the chamber 16. A conduit 35 (see FIG. 2) is connected to the vent passage 34, which may either be exhausted to the environment or led to the induction system for the engine or motor to be consumed during the combustion process in the engine, etc., with which the device 10 is associated.

The base 12 also preferably comprises a second (or more) generally annular wall 36 which is concentric with the wall 28 and also may be generally frustoconical. The generally annular second wall 36 also preferably has one or a plurality of channels 37 (see FIG. 5) formed therein, the channels 37 being radially offset from the channels 29. For example, two channels 29 are provided each offset about ninety degrees from the two channels 37, with one of the channels 37 (the left most channel in FIG. 5) in alignment with an oil discharge opening 40 from the chamber 16.

Both of the elements 11, 12 are dimensioned and shaped so that the bosses of 11', 11", 12', 12" (see FIGS. 3 through 8 in particular) are associated therewith. The boss 12" has the opening 40 therein, while the boss 11' has a primary inlet for oil to the entire unit 10, the primary inlet being indicated by reference numeral 42 in FIGS. 1 and 3.

The inlet 42 includes a metering jet, shown generally by reference numeral 43, therein through which the oil is metered when originally introduced into the device 10 so that it will flow slowly through the oil filter 45 (see FIG. 1) which will be hereinafter described. The metering jet 43 leads to a passageway 46 which in turn leads to a substantially 360 degree cavity 47 (see FIGS. 1, 2, and 8) which is in operative communication with the cotton pad 48 disposed at the bottom of the oil filter 45. A one micron cotton pad 49 may be provided backing up the pad 48, and a Buna rubber sealing gasket 50 or the like is provided between the filter 45 and the reclamation device 10. A check valve 44 is preferably provided between the cavity 47 and the pad 49, or elsewhere in the device 10 or filter 45 where practical. The check valve 44 may be of the type having a perforated plate covered by a rubber flap above (as seen in FIG. 1) the plate, the flap allowing flow of oil from cavity 47 to pad 48 through the perforated plate, but the flap closing the perforations in the plate and preventing the flow of oil in the opposite direction.

The oil filter 45 preferably includes an outer metal (e.g. steel) canister 52, and an inner common concentric, central, perforated mandrel 53. A twisted continuous filament of unbleached natural cotton, shown generally by reference numeral 55 in FIG. 1, preferably is provided in a spiral configuration around the central perforated mandrel 53 so that the portions 56 thereof adjacent the mandrel 53 have a density which is at least 10% higher than portions 57 thereof adjacent the canister 52. Preferably the density differential is even greater than 10%, e.g., more than 25%. In this way large particles tend to be trapped by the low density portion 57, while smaller particles are trapped by the higher density portion 56, and the useful life of the filter 45 is extended, while it operates more efficiently. A strong compression (e.g. coil) spring 60 is preferably provided holding an inner canister, including the mandrel 53, tightly sealed against the element 10, and the filter 45 seals by screwing it onto the exteriorly threaded nipple 61 disposed at the central portion 14 of the evaporator head 11 in defining the oil inlet conduit 15 therein.

In operation of the oil reclamation device 10 and oil filter 45 in FIG. 1, contaminated oil from the motor or engine or the like is fed by a suitable conduit to the inlet opening 42 of the head 11. The oil passes through the metering jet 43 so that it slowly moves into the cavity 47, passing through the rubber check valve 44 before passing into contact with the pads 48, 49. The check valve 44 functions so that when the unit 10 is not in operation, oil back pressure will not force oil to the pump, and so that oil will not be lost when the oil is being changed. The oil then proceeds upwardly through the pads 48, 49 first into the outer portion 57 of the cotton filtering element 55, and then moves inwardly to the perforated mandrel 53. The filter 45 removes the particles, both large and small, from the oil, and then the filtered oil moves into the inlet conduit 15 of the reclamation device 10.

The oil flows from conduit 15 downwardly into the outwardly flaring small (e.g. 1/16 inch) passages 32, and from the passages 32, the oil streams impact primarily the inner heated surface 30 of the generally annular wall element 28, flowing in a thin film down the surface 30. Electrical energy is supplied from a battery or like source of electrical energy through the wire 24 to the upwardly extending electric resistance heating element 18, which heats the entire base 12 by conduction, and additionally heats the head 11 by conduction due to the good heat transmitting surface 19 contact area therebetween. The heat supplied is sufficient to evaporate the light liquids in the oil, such as fuel, water and antifreeze, or like contaminants, without evaporating a substantial amount of the oil itself.

The evaporated contaminants move—as seen in FIG. 2—out the vent 34 to be carried away by the conduit 35 to an appropriate location. The oil being refined moves through the channel 29 radially outwardly, into contact with the outer generally annular wall element 36, and then ultimately through channels 37. The oil is constantly subjected to heat sufficient to cause evaporation of light liquids during the entire time it is in the chamber 16. Eventually, the substantially contaminant-free oil flows through the channels 37 to the outlet opening 40, being recirculated back to the engine from which it came. The chamber 16 is low pressure, which facilitates the evaporation of the contaminants, and the oil is typically discharged from the outlet 40 by gravity.

An alternative embodiment 70 of the invention is shown in FIGS. 9–14 and incorporates many of the advantages of invention as provided in the above embodiment 10 and adds further features. While utilizing the arrangement of an oil filter 72 connecting to the head 74 above the heating chamber 76, the present embodiment 70 generally provides a canister chamber 78 permitting use of a larger volume of filter media. With this increased filter media volume, saturation of the media is further delayed, and the useful life of the media is prolonged. The oil filter 72 can also be manufactured less expensively than an oil filter requiring in own sealed outside casing.

Figure 9:
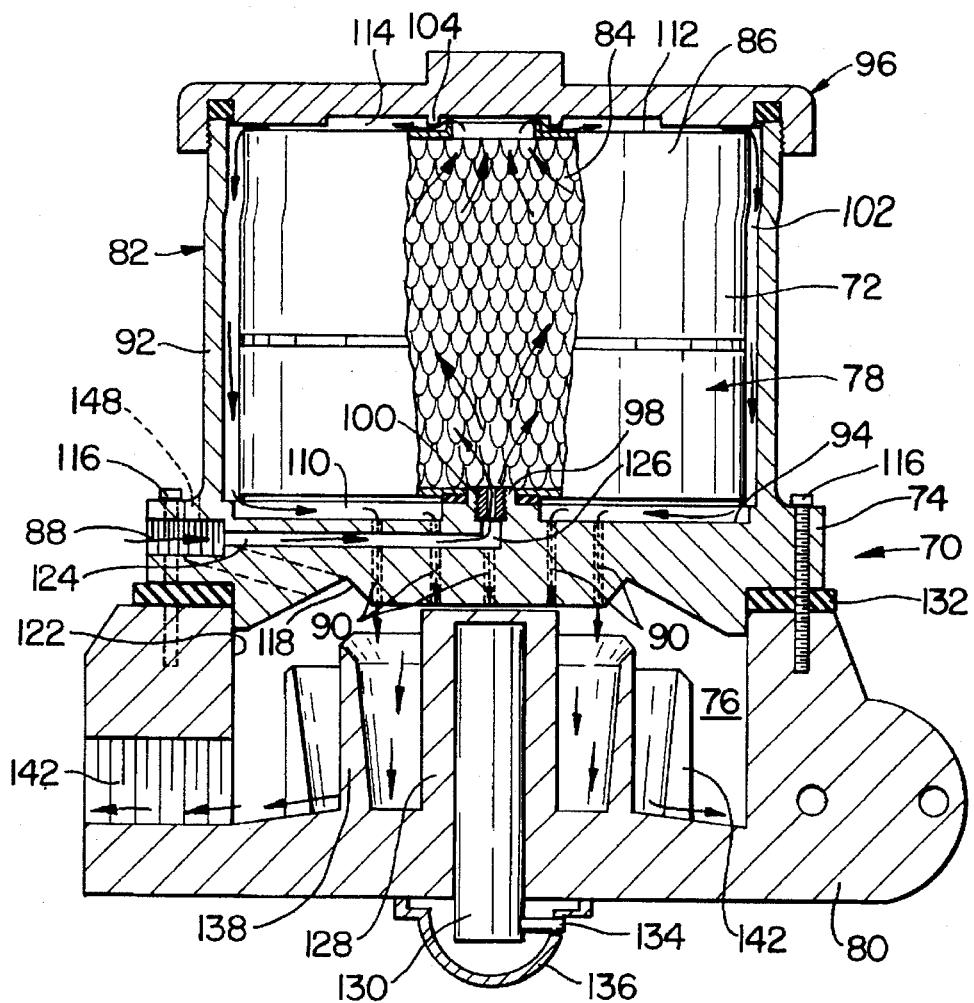
FIG. 9 is a side view, mostly in cross section but partly in elevation, of an alternative embodiment of an oil reclamation device according to the present invention including an oil filter canister housing.
Figure 10:
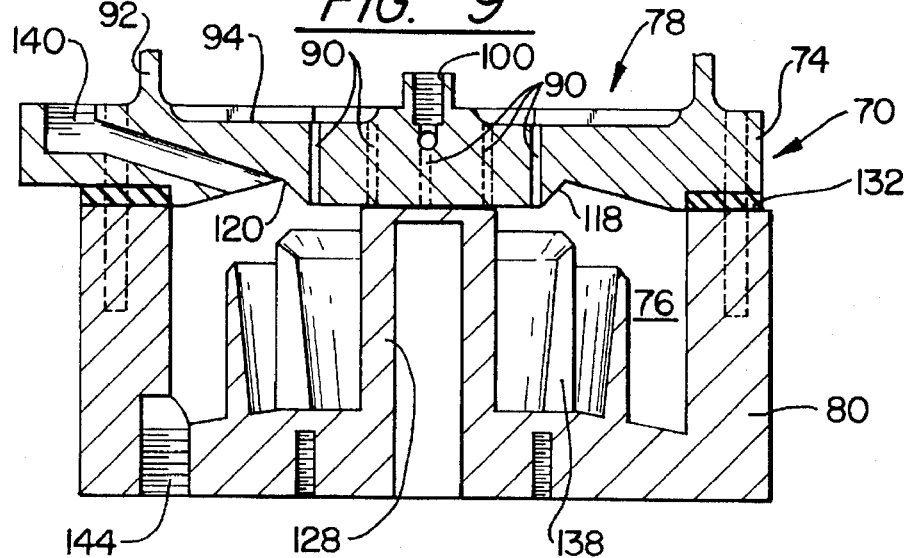
FIG. 10 is a view like that of FIG. 9, only turned ninety degrees.
Figure 11:
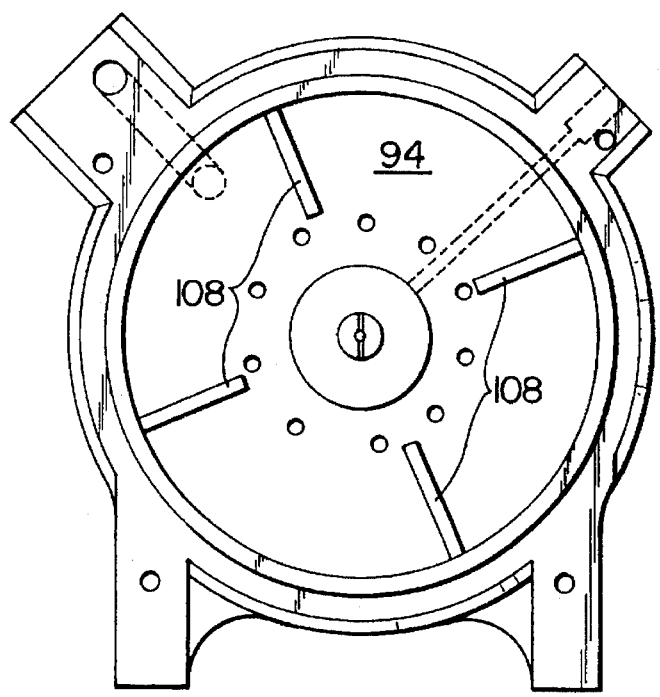
Figure 12:
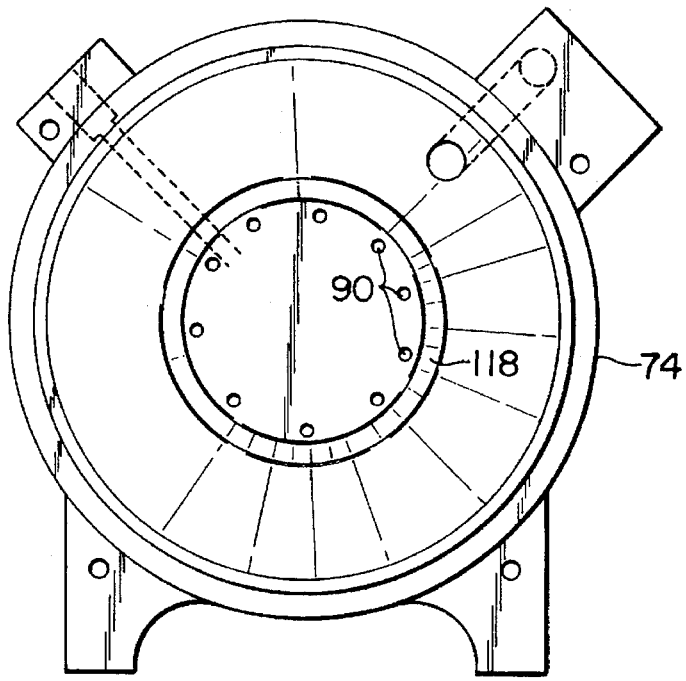
FIG. 12 is a bottom plan view thereof.
Figure 13:
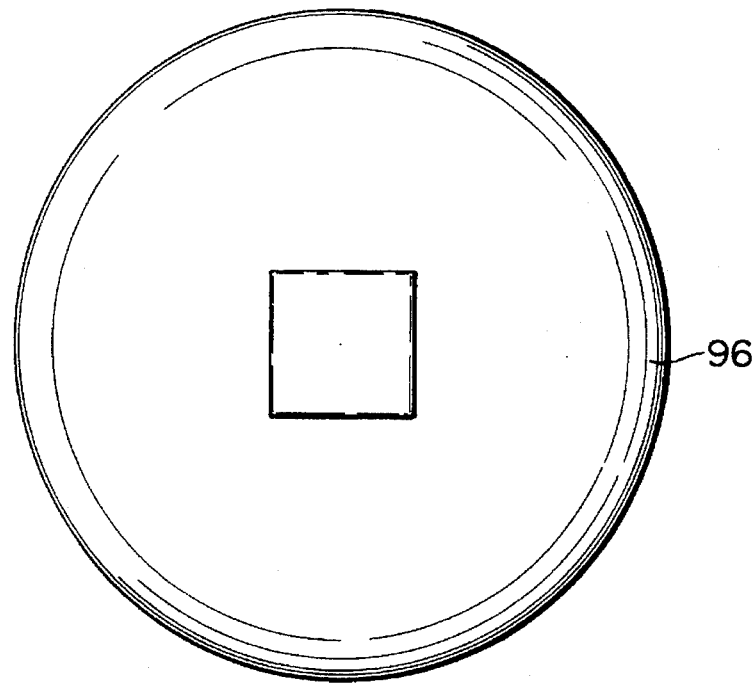
Figure 14:
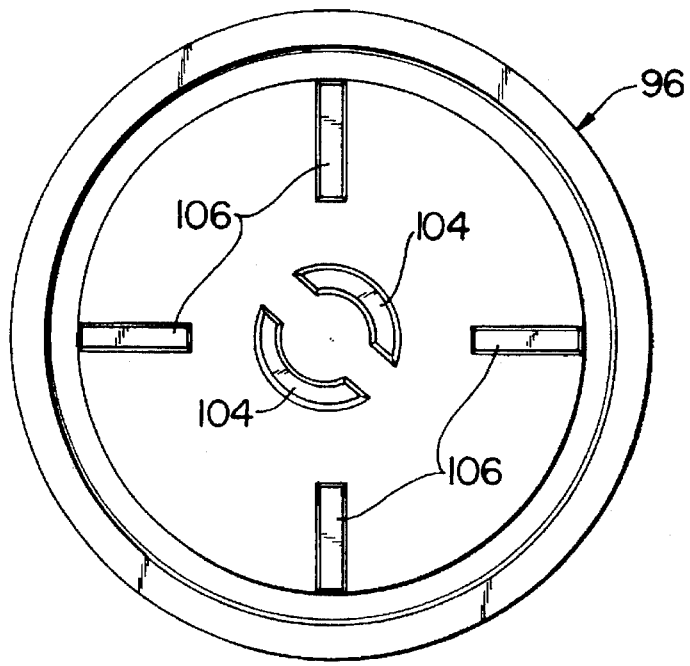
FIG. 14 is a top view thereof.

Referring to FIGS. 9–14 and particularly to FIGS. 9 and 10, the oil reclamation device 70 generally includes the head 74 removably mounted to a base 80 to define an evaporation chamber 76 therebetween. The device 70 further includes a filter canister housing 82 for receiving the filter canister 72, which can include filter media 84 encased in a perforated shell 86.

The device 70 provides an oil inlet 88 preferably in the head 74 for receiving contaminated oil to be filtered. The incoming oil is routed through the head 74 to the canister housing 82 where it is filtered through the filter media 84 and transferred through channels 90 in the head 74 to the evaporation chamber 76 for evaporative filtration.

The filter canister housing 82 has a continuous housing wall 92, which can be integrally and unitarily formed, such as by casting, with the head 74 and which extends upwardly from the upper surface 94 of the head 74. The housing wall 92 can alternatively be separately manufactured and secured to the head 74 by bolts or other conventional fastening techniques.

The canister housing 82 is defined by the continuous wall 92, a housing lid 96 and the upper head surface 94. The continuous wall 92 is preferably circular to correspond to the preferably circular geometry of the filter canister 72. Alternative wall geometries are also possible. The housing lid 96 is preferably threadingly mounted to an open end of the housing wall 92.

The canister housing 82 slidingly receives the filter canister shell 86 containing filter media 84. The filter media can be a wound cotton arranged in a spiral fashion to create a density distribution as discussed above with respect the exemplary device 10. Alternatively, the filter media 84 can be compressed in the canister shell 86 without a hollow core, as illustrated in FIG. 9. The canister shell 86 provides an inlet opening 98 which receives a projection 100 from the head 74 and serves to center the canister shell 86 in the housing 82 to thereby form an annular space 102 between the outer circumference of the canister shell 86 and the housing wall 92.

The interior surface of the lid 96 can also provide raised surfaces, such as annular ridges 104 (SEE FIG. 14), for positive flow of oil exiting the canister 72. The interior surface of the lid 96 can provide further raised surfaces, such as radial ribs 106 (FIG. 14), for establishing a passage between the lid 96 and the top of the canister 72 connecting to the annular spacing 102. Similarly, the upper surface 94 of the head 74 can provide raised surfaces, such as a plurality of radial ribs 108 (See FIG. 11) to separate the filter canister 72 from the head surface 94 and thereby define an oil passageway 110 from the annular spacing 102 to the channels 90 leading to the evaporation chamber 76.

Incoming oil is preferably first introduced to the filter media 84 internally through the projection 100. The oil is filtered and exits through perforations 112 in the canister shell 86 at its top. The oil leaving through the top is then routed through the top passage 114 to the annular spacing 102 where it is transported to the lower passage 110 and through the channels 90 to the evaporation chamber 76.

The interior surfaces of the head 74 and base 80 can be constructed in a manner similar to that described with respect to the exemplary device 10. The head 74 is preferably secured to the base 80 by a plurality (e.g., four) of stainless steel machine screws 116, although conventional techniques for securing the base 80 and the head 74 can be employed, provided a sealing arrangement is obtained. The relative positions of the screws 116 are seen most clearly in FIG. 9. The head 74 includes a central portion 118 which extends downwardly toward the base and contains the passages 90 for carrying oil to be treated to the evaporation chamber 76. Extending radially from the central portion 118, the interior surface 120 of the head 74 can extend downwardly toward the base 80, such as in the angled fashion illustrated, to mate in the opening 122 of the base 80. The channels are preferably straight axial bores to facilitate manufacture but can be provided in alternative configurations so long as a continuum is made between the canister housing 82 and the evaporation chamber 76. The oil inlet 88 to the canister housing 82 is provided by a radial passage 124 transitioning to an axial passage 126 extending into the protrusion 100. Again, alternative constructions are possible.

The base 80 preferably includes a hollow generally tubular post 128 in which a preferably sealed stainless steel electric resistance heating element 130 (which preferably extends generally vertically) is provided. Around the periphery of the head 74 and the base 80 where they are clamped together by the machine screws 116, a seal 132 is preferably provided between them. The seal 132 can be a conventional flexible and/or resilient sealing material, such as synthetic rubber.

The heating element 130 has a portion thereof which extends downwardly from the bottom of the base 80. An electric wire or wires 134 is/are provided for supplying electric current to the heating element 130, which can be a conventional resistance coil heater, and the downwardly extending portion may be protected by a protective cap 136, e.g. also of a metal such as aluminum.

Extending upwardly from the base element is at least one generally annular wall element 138. The wall element is generally annular 138, although having at least one and preferably two (or more) channels formed therein for the radially outward flow of oil from the central area.

The head also preferably comprises a vent 140 through which fumes (e.g. evaporated light liquids from the oil, such water, fuel, blow-by gases, and antifreeze) pass out of the chamber. The base 80 provides an outlet 142 for allowing the drainage of filtered oil for return to the engine for further use. The outlet can extend to a side opening as shown in FIG. 9 and alternatively and preferably, the outlet 144 as shown in FIG. 10 can be positioned to exhaust through the bottom of the base 80 and thus reduce the height requirements of the device 70. Similarly, an alternative preferred vent 148 can be routed through the same side ear or boss 150 as the oil inlet 88, as shown in FIG. 9 to further reduce the height of the unit 70. The head and base are preferably constructed of heat conducting material, such as 356 aluminum which has less oil porosity than 319 aluminum.

It will thus be seen that according to the present invention a simple, efficient and effective oil reclamation device, and oil filter associated therewith, have been provided having advantages over conventional oil reclamation devices, including efficiency of evaporation of the contaminants and ease of access of the filter. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An oil reclamation device comprising;

an evaporator head;

an evaporator base mounted to and below said evaporator head, said head and base defining an evaporator chamber therebetween;

a heating element connected to said evaporator base for heating oil containing contaminants within said evaporator chamber by conduction and convection to evaporate light contaminants in the oil;

a vent from said evaporator chamber;

an oil discharge conduit from said evaporator chamber formed in said evaporator base; and an oil inlet conduit feeding oil from said head toward said evaporator chamber.

2. An oil reclamation device as recited in claim 1 further comprising an oil filter for filtering oil prior to the oil passing into said oil inlet conduit.

3. An oil reclamation device as recited in claim 2 wherein said oil filter is mounted to said evaporator head on the opposite side of said evaporator head from said evaporator base.

4. An oil reclamation device as recited in claim 3 wherein said oil filter comprises an outer canister having filtering media therein, and a central perforated mandrel; said filtering media having a density differential of at least about 10% between said outer canister and said central mandrel, the density being higher adjacent said mandrel than adjacent said canister; and wherein said oil inlet conduit is adjacent said central mandrel, said oil filter supported on said evaporator head.

5. An oil reclamation device as recited in claim 4 wherein said filtering media comprises continuous filament unbleached natural cotton wrapped around said perforated mandrel.

6. An oil reclamation device as recited in claim 1 wherein said evaporator base comprises a base element and at least one generally annular wall element extending upwardly from said base element toward said evaporator head, said annular wall member having at least one channel formed therein for allowing drainage of oil.

7. An oil reclamation device as recited in claim 6 wherein said heating element is substantially concentric with said wall elements, and comprises a sealed stainless steel electrical resistance heating element.

8. An oil reclamation device as recited in claim 6 wherein the oil containing contaminants is heated in said evaporator chamber by convective and conductive heating.

9. An oil reclamation device as recited in claim 8 wherein the oil containing contaminants flows via said oil inlet conduit to an inner side of said generally annular wall element.

10. An oil reclamation device as recited in claim 1 further comprising a filter canister housing extending from said evaporator head on the opposite side of said evaporator head from said evaporator base, said filter canister housing having a removable lid and enclosing an oil filter for filtering oil prior to the oil passing into said oil inlet conduit.

* * * * *